May 30, 1961
M. R. J. WYLLIE
2,986,515
PURIFICATION OF IONIC SOLUTIONS BY IMBIBITION
INTO AND MECHANICAL EXPULSION
FROM ION-EXCHANGE MATERIAL
Filed Jan. 19, 1956
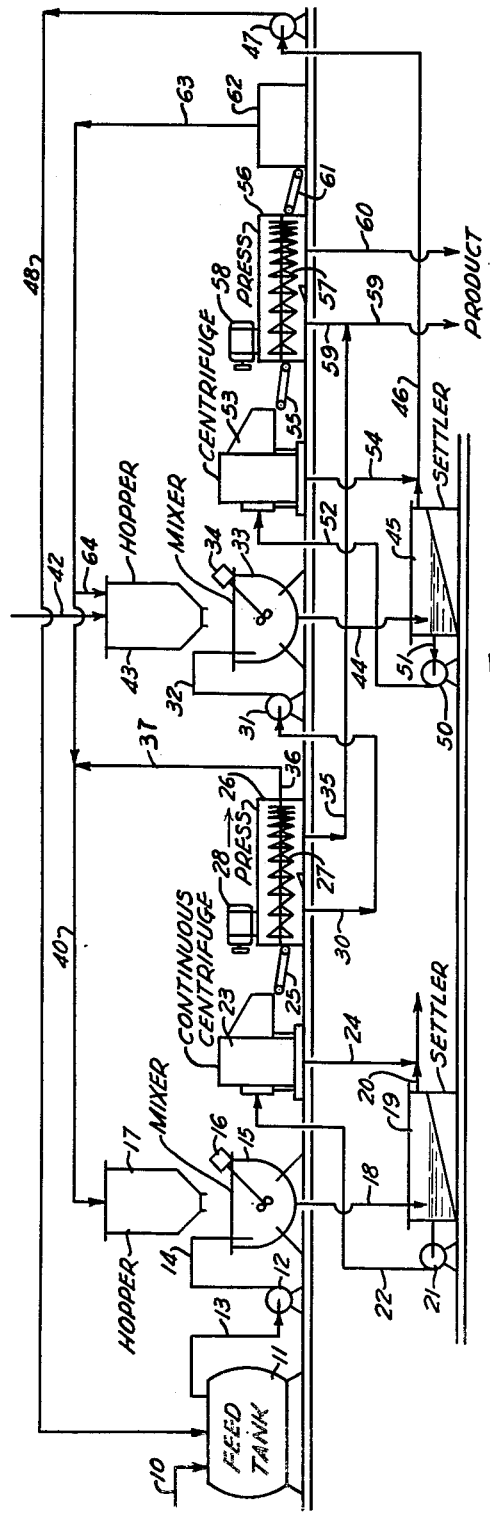
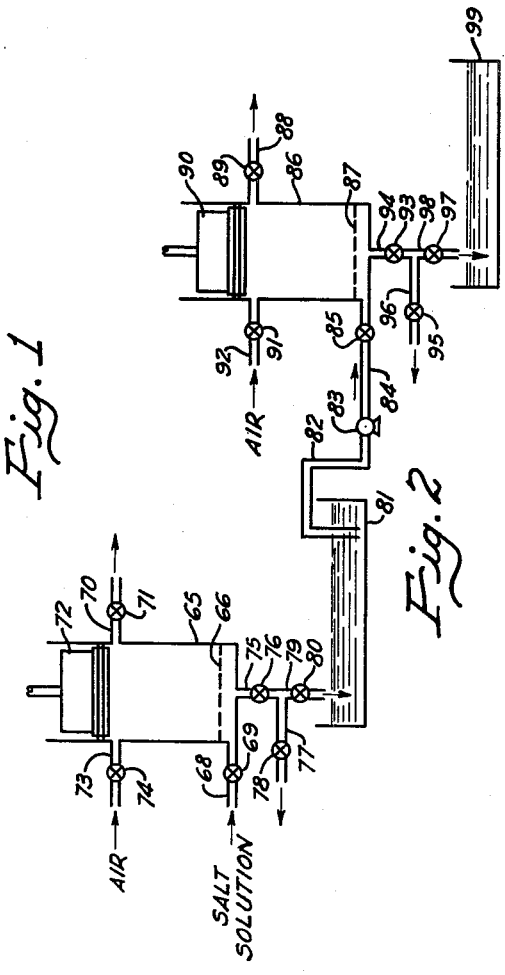
INVENTOR.
MALCOLM R. J. WYLLIE
BY
*Horace B Cooke*
HIS ATTORNEY

United States Patent Office 2,986,515
Patented May 30, 1961

2,986,515

PURIFICATION OF IONIC SOLUTIONS BY IMBIBITION INTO AND MECHANICAL EXPULSION FROM ION-EXCHANGE MATERIAL

Malcolm R. J. Wyllie, Indiana Township, Allegheny County, Pa., assignor to Gulf Research & Development Company, Pittsburgh, Pa., a corporation of Delaware Filed Jan. 19, 1956, Ser. No. 560,186

13 Claims. (Cl. 210—33)

This invention relates to method and means of removing ionized solutes from water and has particular reference to the purification of water containing in solutions ionized compounds, especially when such compounds are in low concentration.

In most circumstances improved distillation means are most practicable to employ in obtaining water free of dispersoids or solutes. In some instances, however, the size of the installation and the degree of purification required render it uneconomical to use even the more advanced means of distillation.

My invention consists of a quite different method and means of separating dissolved and at least partially ionized, i.e., at least weakly ionized, compounds from solution and briefly stated comprises bringing a solution containing an at least partially ionized solute into contact with an ion-exchange resin gel, which swells in contact with the solution and absorbs solvent from the solution, draining the surficial solution away from the ion exchange material, and thereafter squeezing the swollen ion-exchange material by a force supplied thereto and expressing from said material a solution of substantially reduced concentration of solute. The ion exchange resin gels, which swell in contact with aqueous solutions and at the same time remain coherent and fairly permeable, are insoluble, infusible synthetic organic polymeric matrices having dissociable ionic groups chemically bonded thereto and having water in gel relationship therewith. More generally the ion-exchange resin is an insoluble polyelectrolyte gel which can exchange ions when they are in solution. My invention is adaptable for use with small presses as for example in sea rescue kits and is also applicable to plant size installations. Each or any of these applications of the method and means of my invention can be most profitably employed in a multiple system in which a partially purified liquid is subjected to several repetitions of the process until a desired degree of purity is obtained. My method and means are especially useful in water purification.

In the patent drawing which is supplied for the purpose of illustrating the invention, Fig. 1 is a schematic flow diagram in front elevation showing a two-stage installation for the preparation of solutions having a reduced content of ionizable compounds, and Fig. 2 is a diagram of laboratory apparatus in which results obtainable by employing my process are illustrated and described in specific examples in the specification and which further illustrate the fundamental combination of equipment applicable to all such situations, either hand presses or plant size installations.

My invention is also applicable to the function of increasing the concentrations of ionizable compounds in water in which case multiple stage processes can again be used until the desired increase in concentration of ionizable compounds in the water has been obtained.

Referring more particularly to Fig. 1 an aqueous solution of ionizable compounds is fed through line 10 into feed tank 11. Solution from feed tank 11 is pumped by pump 12 through line 13 and line 14 into mixer 15 which is supplied with mixing means 16. A hopper 17 containing dried, conditioned ion-exchange resin is disposed above the mixer 15 in such manner that the hopper can be opened to deliver a quantity of ion-exchange resin into the mixer 15. After a brief period in which the ion-exchange resin and the water are thoroughly mixed, both the ion-exchange resin and the solution are discharged through line 18 into settler 19 in which the ion-exchange material settles out of the mixture in a slurry which is pumpable, as is contemplated for the present apparatus. Solution containing an increased concentration of ionizable compound is discharged from the settler 19 through line 20.

The settled slurry from settler 19 is pumped by a pump 21 through line 22 into a continuous centrifuge 23. Aqueous solution that clings to the surface of the ion-exchange resin is removed in the said centrifuge 23 and flows from the centrifuge through line 24 to juncture with line 20 whence the mixed effluents can be directed to waste. In operations having the purpose of concentrating ionic solutions, the effluent in line 20 would be directed to another stage of the process and into contact therein with a further quantity of ion-exchange material.

Ion-exchange resin which is apparently surface dry flows from the centrifuge 23 and is conveyed by conveyor means 25 into a press 26 containing, for example, a screw of decreasing pitch 27 that is operated by the motor 28. As the ion-exchange resin is moved by the said screw 27 in the direction of the arrow indicated on the drawing it is brought under an increasing squeeze pressure. During the time that the ion-exchange material is first squeezed in the press, the water expressed by this squeezing action is withdrawn through line 30 by pump 31 and is pumped thereby through line 32 into a second mixed 33 having a mixing means 34 and being substantially identical to the aforesaid mixer 15.

The ion-exchange resin in the press 26 is then subjected to a much higher squeeze pressure by the remainder of the length of the screw 27 and yields an expressed water which for many purposes will be sufficiently purified. Consequently this liquid is flowed from the press 26 through line 35 to means for storing or utilizing the product.

Ion-exchange resin which has been squeezed to partial dryness in the press 26 and which has been restored to substantially its original volume is removed from the press 26 by means 36 and is passed by means 37 and 40 into the hopper 17 from which it can be withdrawn for reuse in the said mixer 15.

Water of considerably reduced concentration of ionizable compound is introduced through line 32 into the said mixer 33. Ion-exchange resin that is delivered from a source, not shown, through a line 42 into a hopper 43 is then added to the solution in the mixer 33. After thorough mixing of the water and the ion exchange material has been accomplished and the material, as determined by prior test, has swollen to approximately its maximum volume, the entire mixture is withdrawn from the mixer 33 through line 44 into settler 45 in which a thick slurry of water and ion-exchange resin settles and from which can be decanted a solution containing a slight increase in concentration of ionizable compound. The decanted liquid is withdrawn through line 46 and is pumped by pump 47 through line 48 into feed tank 11. In many instances, of course, there will be insufficient value in the water withdrawn from settler 45 to warrant its retreatment and it may well be discarded, but as it will have a concentration of ionizable compounds slightly less than that of the feed stock, in some instances it will be profitable to recycle it.

Settled slurry of ion-exchange resin and water are pumped by pump 50 from the settler 45 through line 51 and through line 52 into a continuous centrifuge 53. A substantial amount of the water which clings to the surface of the ion-exchange resin is separated in the centrifuge 53. This so-separated water flows through line 54 to juncture with line 46 and into admixture with the decanted water from settler 45.

Partially dried ion-exchange resin is withdrawn from the centrifuge 53 by means 55 and is introduced into a press 56 having screw 57 and motor 58, said press, screw and motor being of substantially the same design as that of press 26, screw 27 and motor 28. Press 56 is also a two-stage press, and, from the first stage where a lower squeeze pressure is employed, a liquid is withdrawn through line 59 into juncture with line 35 and this mixed liquid can be flowed either to an additional stage of ion exchange treatment (not shown) or to means for storage of utilization of the produce liquid. Liquid from the second stage of the press 56 which has been subjected to a higher squeeze pressure is flowed through line 60 from the press 56 and can be directed either to additional means or to an additional stage of ion exchange treatment or can be sent to storage or means for utilization of the liquid.

Squeezed and partially dried ion-exchange resin is removed from the press 56 and carried by means 61 to storage means 62. The ion-exchange resin, which has been restored to substantially its original volume, is passed from storage 62 by means 63 to the hopper 17 or can be directed by means 64 to the hopper 43 for reuse either in the first or second stage of the process.

A plan such as has been described above and illustrated in Fig. 1 is capable of treating 100 mixer volumes per day of water containing about 11,000 parts per million of salt and supply the same through line 60 as potable drinking water and through line 59 as water suitable for many industrial or domestic purposes.

Reference is now made to Fig. 2 which illustrates a specific example of my method and means as employed in the deionization of a 0.48 normal aqueous sodium chloride solution. A cylinder 65 is charged with a dry nuclear sulfonic cationic exchange resin manufactured by Dow Chemical Company and having the trade name "Dowex-50." Bauman, Skidmore, and Osmun (Industrial and Engineering Chemistry 40, page 1350 (1948)) define "Dowex-50" as a "cation-exchange resin . . . with a crosslinked aromatic hydrocarbon chain containing nuclear sulfonic acid groups as the sole cation active group." U.S. Patent No. 2,566,353 to Mills, issued September 4, 1951, defines "Dowex-50" as a sulfonated polystyrene. The size distribution of Dowex-50 is as follows:

TABLE I

*Wet mesh analysis of Dowex-50 in sodium form as shipped*

|  | Percent |
|---|---|
| On 20-mesh | 50.0 |
| On 30-mesh | 35.0 |
| On 40-mesh | 12.0 |
| On 50-mesh | 2.5 |
| On pan | 0.5 |

A perforated metal screen 66 is provided near the base of the cylinder 65 upon which the ion-exchange resin is supported. The said sodium chloride solution is flowed from a source, not shown, through line 68 in which is disposed valve 69 and into the bottom of the chamber of the cylinder 65. The water flows upwardly over the ion-exchange resin and leaves the cylinder 65 through line 70 in which is disposed valve 71. The partially dry ion-exchange material which is charged to the cylinder fills the chamber thereof to only about ¾ its height. The top of the charge is defined by piston 72 shown in solid lines in a withdrawn position.

After approximately 5 volumes of salt solution have been passed through the cylinder 65 and expelled through line 70, valves 69 and 71 are closed thus preventing further flow of salt solution through the cylinder. Aqueous solution which has been discharged through line 70 will be slightly increased in salt concentration over feed solution. The passage of several volumes of salt solution through the cylinder is desirable so that the salt concentration in the surficial water on the resin particles will be reduced to a level at least approaching the concentration of the influent solution. This in turn is advantageous for the reason that the salt concentration of the initial increments of water squeezed from the ion-exchange resin will approximate that in the surficial solution remaining on the ion-exchange resin particles. In practice I have found that after approximately five volumes of said solution have been passed through the compression chamber, the normality of the effluent solution, and therefore that of the solution on the surfaces of the particles, will be approximately equal to the normality of the influent solution. Ordinarily this aqueous sodium chloride solution is discarded; it can, however, be recycled to line 68 for the extraction of more desalted water therefrom. In a system directed to the provision of a more concentrated solution, effluent from valve 71 would be passed through several additional beds of partially dry ion-exchange resin until the desired concentration is reached.

Cylinder 65 is also supplied with air inlet line 73 having disposed therein valve 74, which inlet line feeds into an upper portion of cylinder 65 at a point below the piston 72 in its upper retracted position. The cylinder 65 is also supplied with an outlet line 75 having disposed therein a valve 76 which line leads from the bottom of the cylinder to juncture with line 77 having disposed therein valve 78, and line 79 having disposed therein valve 80. As soon as valves 69 and 71 have been closed valves 76 and 78 are opened and salt solution still present in the cylinder is drained therefrom through lines 75 and 77, valve 80 in line 79 being kept closed during this operation.

An air blast is then directed from a source (not shown) through line 73 into the chamber of the cylinder 65, the air being expelled through open lines 75 and 77. This blast of air serves to remove physically surface water from the ion-exchange material. When the cylinder has been completely flushed with air, valve 74 is closed and piston 72 is lowered under pressure until the bed of ion-exchange material in the cylinder 65 has been compressed into a space, defined by the perforated plate, the cylinder and the piston that is 61.5 percent of original volume. In this specific example the cylinder 65 is of such volume that 4.4 gallons of aqueous solution are obtained by the compression step; this solution flows from the cylinder through open lines 75 and 77. The average normality of this solution is 0.45 although the last portion so-expressed will have a normality of 0.37.

At this point valve 78 is closed and valve 80 is opened. The piston 72 is then lowered under further pressure until the resin bed is compressed into a space defined by the perforated plate, the cylinder, and the piston that is 53 percent of original volume and 4.4 gallons of aqueous salt solution having a normality of 0.18 are expressed. This solution flows through open lines 76 and 80 into sump 81. Upon the completion of this step valves 80 and 76 are closed, piston 72 is retracted to its original position and the above described cycle is repeated.

As soon as a sufficient volume of solution is collected in sump 81, solution is withdrawn therefrom through line 82 and is pumped by pump 83 through line 84, having disposed therein opened valve 85, into a second cylinder 86. Solution may be continuously withdrawn from the sump 81 during the cycles of flushing operations in cylinder 86.

Solution entering the chamber of cylinder 86 flows upwardly in contact with a bed of ion-exchange resin supported on perforated plate 87 and flows out of the chamber through line 88 in which is disposed open valve 89. The bed of dry ion-exchange resin in cylinder 86 fills the cylinder from the perforated plate 87 to a point about ¾ the distance from the plate 87 to the face of a piston 90 in its retracted position as shown in solid lines in Fig. 2.

As soon as a volume of liquid substantially equal to 5 times the volume of the chamber of cylinder 86 has been passed therethrough, pumping of solution from the sump 81 is discontinued and valves 85 and 89 are closed. The liquid which during this operation has flowed from line 88 can be discarded to waste or recycled either to the supply line 68 or to the solution in sump 81. Valve 91 in air line 92, valve 93 in outlet line 94 and valve 95 in line 96 are then opened and air is blasted into the chamber of the cylinder 86 to remove physically surface liquid from the ion-exchange resin. Valve 97 in line 98, which extends from juncture with lines 94 and 96, is kept closed during this operation. Solution which is removed by the air blasting step and which has a normality of about 0.18 or slightly higher can be discarded or can be recycled to solution inlet line 68 or the sump 81.

Upon completion of the air flushing step, valves 91 and 95 are closed and valve 97 in line 98 is opened. Piston 90 is then lowered until the space occupied by the chamber of cylinder 86 is reduced in volume to 50 percent of the former volume. During this compression 11 gallons of a solution having an average normality of 0.09 is caused to flow through open lines 94 and 98 into the sump 99. The solution as it flows to sump 99 during the compression by piston 90 will vary in normality from an initial 0.18 to a last drop normality of 0.004. The second-stage apparatus can be operated with a plurality of compressing vessels (not shown) and a portion of the expressed liquid can be separated from the remainder so that aqueous salt solutions having a selected concentration between the average normality of 0.09 and a last drop normality of 0.004 can be obtained. Thus even with a two-stage operation aqueous solution of sodium chloride can be sufficiently reduced in concentration to render the water useful for most purposes.

In another specific example of operation according to my invention to reduce the salt content of water, an anion exchange resin was employed. Particles of a strongly basic-quaternary alkanolamine-type anion exchange resin in the chloride form was conditioned in a solution of caustic and then treated to restore the chloride form. The size distribution of this anion exchange resin was as follows:

TABLE II

*Wet screen analysis (U.S. standard screens)*

Size of mesh: Percent retained
- 20 _____ 19.1
- 30 _____ 44.2
- 40 _____ 29.3
- 50 _____ 6.9
- 70 _____ 0.5

Fines content: Less than 2%.

The exchange resin was then brought into contact with a 0.2 normal solution of magnesium chloride in a manner similar to that of the preceding example in which salt solution was passed through the bed of ion-exchange material in the cylinder 65. After equilibrium was reached between the resin and the magnesium chloride solution, the resin was removed from contact with the solution and was placed on a Büchner funnel and a vacuum was pulled on the bed of resin so as to remove surficial water therefrom. A sample of the resin was removed and the water content of the equilibrated resin was determined to be 1.419 grams of water per gram of resin. The remainder of the equilibrated resin was introduced into a metal cylinder and subjected to the pressure of a piston. Samples of expressed water were taken for each ⅛ inch movement of the piston and about 1.6 milliliters of water were expressed for each increment, after the first increment, of piston movement. After 12 samples had been taken and the bed of anion exchange resins was proportionately compressed, the pressure on the bed of anion exchange resin was 15,000 pounds per square inch. The total volume of expressed liquid was 20.1 milliliters and the average normality of the expressed liquid was 0.117. It was determined that the foregoing process expressed 99% of the salt content of the resin and 60% of the water content. The single step thus performed reduced the salt concentration of the treated solution to one-half its original concentration. It can be seen also that further compression of the resin would yield an even more dilute solution inasmuch as 99% of the salt has already been removed. In addition separation of the different portions of expressed water from the above single compression step can yield solutions of much reduced average salt concentration. For example, the underlined numbers show that one-half of the expressed water if so separated will have a salt concentration of about one-quarter of that of the feed solution.

TABLE III

*Salt solutions expressed from absorbing resin*

| Increment No. | Volume, ml. | Normality (MgCl₂) | Cum. Vol., ml. | Cumulative Avg. Norm. (MgCl₂) | Reverse Cum. Vol., Percent | Cum. Rev. Avg. Norm. (MgCl₂) |
|---|---|---|---|---|---|---|
| 1 | 2.5 | 0.195 | 2.5 | 0.195 | 100.0 | 0.117 |
| 2 | 1.6 | 0.195 | 4.1 | 0.195 | 87.6 | 0.106 |
| 3 | 1.6 | 0.181 | 5.7 | 0.191 | 79.7 | 0.097 |
| 4 | 1.6 | 0.177 | 7.3 | 0.187 | 71.8 | 0.087 |
| 5 | 1.6 | 0.172 | 8.9 | 0.185 | 63.6 | 0.076 |
| 6 | 1.6 | 0.144 | 10.5 | 0.163 | 55.6 | 0.063 |
| 7 | 1.6 | 0.115 | 12.1 | 0.156 | 47.7 | 0.049 |
| 8 | 1.6 | 0.084 | 13.7 | 0.138 | 39.8 | 0.036 |
| 9 | 1.6 | 0.056 | 15.3 | 0.124 | 31.8 | 0.024 |
| 10 | 1.6 | 0.026 | 16.9 | 0.113 | 23.8 | 0.013 |
| 11 | 1.6 | 0.008 | 18.5 | 0.103 | 15.9 | 0.007 |
| 12 | 1.6 | 0.005 | 20.1 | 0.095 | 7.97 | 0.005 |

Generally speaking, either a synthetic cation or an anion exchange resin gel can be employed with equal facility in obtaining solutions of increased or decreased salt concentration from a feed stock salt solution or, more specifically, in the desalting of water. The fact that so many synthetic ion-exchange resins are commercially available makes it possible to select a resin tailored to the specific ions and ion concentration of the solution to be treated. Thus a gel with high crosslinking and low water content will yield on compression fresher water than a gel containing the same number of ion-exchange groups on the matrix but having a lower degree of crosslinking. Conversely, however, more water can be obtained at the same pressure from a resin of lesser crosslinking. However it is also within the scope of my invention to select, for purposes of enhanced efficiency in treatment, an anion exchange resin when the anion of the solution is of large ionic volume or a cation exchange resin in the opposite case. It is furthermore within the scope of my invention to combine in the treatment of solutions, beds of mixed cation and anion exchange resins, or, in the case of treatment in series, as shown in the drawing, an anion exchange resin can be used in one cylinder and a cation exchange resin in another.

Having described my invention I claim:

1. A process of separating a solution of an at least partially ionized solute in a solvent that is ionized to a lesser degree than said solute, into at least one portion having an increased solute concentration and at least one other portion having a decreased solute concentration, the said process comprising: bringing an at least partially dry synthetic ion-exchange resin and solution that contains a substantial proportion of ionized solute into contact with one another; separating unabsorbed solution from the said ion-exchange resin after solution and resin have been in contact at least long enough to permit the resin to absorb solvent from the solution, the so-separated solution constituting the portion of increased solute concentration; and subjecting the ion-exchange resin to mechanical pressure so as to express absorbed solution from the said resin, the so-expressed solution constituting the solution of decreased solute concentration.

2. The process of claim 1 in which the ion exchange resin is a cation-exchange resin.

3. The process of claim 1 in which the ion exchange resin is an anion-exchange resin.

4. The process of claim 1 in which the solution is aqueous and the solute is a compound that is soluble and ionizable in water.

5. A process of separating at least partially ionized aqueous salt solution into a solution having a decreased salt concentration and another solution having an increased salt concentration, the said process comprising: bringing a feed aqueous salt solution that contains a substantial proportion of an ionized salt into contact with a substantially dry synthetic ion exchange resin gel and maintaining salt solution in contact with the said resin for a sufficient period to permit the said resin to absorb a solution of decreased concentration from the feed solution; separating unabsorbed salt solution of increased concentration from contact with said ion exchange resin; and expressing, by imposing mechanical pressure upon the so-treated ion-exchange resin, absorbed aqueous solution from the resin having a decreased salt concentration.

6. The process of claim 5 in which the said resin is brought into contact with a plurality of quantities of feed solution during the said period during which the resin absorbs solution from the feed solution.

7. The process of claim 5 in which feed solution is continuously brought into contact with the said resin and is, except for that portion which is absorbed by the resin, continuously withdrawn from contact therewith.

8. The process of claim 5 in which the ionizable groups attached to the matrix of the ion exchange resin are of the same sign of charge as an ion of substantial concentration in solution which has the largest ionic volume of the ions in said solution.

9. A process of removing soluble salt from water containing a substantial proportion of the same in solution, said salt being in at least partially ionized form, said process comprising: bringing such feed solution into contact with a previously substantially dried synthetic ion-exchange resin gel for a period sufficient for the said resin to absorb water containing a lesser concentration of salt than that of the said feed solution; separating unabsorbed feed solution from the so-treated resin; and expressing, by the application of mechanical pressure upon the resin, absorbed water therefrom in a plurality of separately collected increments and increasing the pressure upon said resin while expressing said increments, solution expressed under the most elevated pressure having the lowest salt concentration.

10. The process of claim 9 in which an increment so-expressed under pressure is recycled to form feed solution to the ion-exchange resin.

11. The process of claim 9 in which compressed ion-exchange resin is, after expression of absorbed water, dried and recycled to the contact of additional feed stock solution.

12. The process of claim 9 in which the synthetic resin is an anion-exchange resin.

13. The process of claim 9 in which the synthetic resin is a cation-exchange resin.

References Cited in the file of this patent

UNITED STATES PATENTS

| | | |
|---|---|---|
| 1,705,908 | De Witt | Mar. 19, 1929 |
| 2,296,897 | Billing et al. | Sept. 29, 1942 |
| 2,678,132 | Beard | May 11, 1954 |
| 2,684,331 | Bowman | July 20, 1954 |
| 2,696,305 | Slover | Dec. 7, 1954 |
| 2,771,193 | Simpson | Nov. 20, 1956 |

OTHER REFERENCES

Simpson and Bauman: "Concentration Effects of Recycling in Ion Exclusion," 46, Industrial and Engineering Chemistry, 1958–1962 (1954).

Wheaton and Bauman: "Ion Exclusion," 45, Industrial and Engineering Chemistry, 228–233 (1953).